United States Patent

Ziolkowski

[11] Patent Number: 6,081,765
[45] Date of Patent: Jun. 27, 2000

[54] SIGNATURES OF MARINE SEISMIC SOURCES

[76] Inventor: Antoni Marjan Ziolkowski, 17 Gordon Terrace, Edinburgh EH16 5QR, United Kingdom

[21] Appl. No.: 09/091,628
[22] PCT Filed: Dec. 20, 1996
[86] PCT No.: PCT/GB96/03182
§ 371 Date: Jun. 19, 1998
§ 102(e) Date: Jun. 19, 1998
[87] PCT Pub. No.: WO97/22892
PCT Pub. Date: Jun. 26, 1997

[30] Foreign Application Priority Data

Dec. 20, 1995 [GB] United Kingdom .................. 9526099

[51] Int. Cl.[7] .................................................. G01V 1/137
[52] U.S. Cl. .................................................................. 702/17
[58] Field of Search ................................. 702/14, 17, 18, 702/138, 140, 98, 50, 51, 54; 367/24, 21

[56] References Cited

U.S. PATENT DOCUMENTS 4,108,272  8/1978  Paitson et al. .

4,476,553  10/1984  Ziolkowski et al. .

FOREIGN PATENT DOCUMENTS

| 0066423A1 | 12/1982 | European Pat. Off. . |
| 0066423B1 | 1/1988 | European Pat. Off. . |
| 0400769A2 | 12/1990 | European Pat. Off. . |
| 0555148A1 | 8/1993 | European Pat. Off. . |

OTHER PUBLICATIONS

Ziolkowski, "Measurement of Air Gun Signatures Using Gun–Mounted Pressure Sensors", EAGE 57th Conf. and Tech. Exhibition, Glasgow, Scotland, May 29–Jun. 2, 1995.

*Primary Examiner*—Donald E. McElheny, Jr.
*Attorney, Agent, or Firm*—Dann, Dorfman, Herrell and Skillman; Henry H. Skillman

[57] ABSTRACT

A method of determining the far-field signature of the seismic wave produced by at least one marine seismic source (20) involving mounting pressure sensing means (2) on the or each seismic source (20) and taking account of both linear and nonlinear components of pressure measurements made by the pressure sensing means (2) to determine the far-field signature of the seismic wave. The invention covers the generation of a seismic wave from a single seismic source and an array of seismic sources and also relates to marine seismic source apparatus.

20 Claims, 13 Drawing Sheets

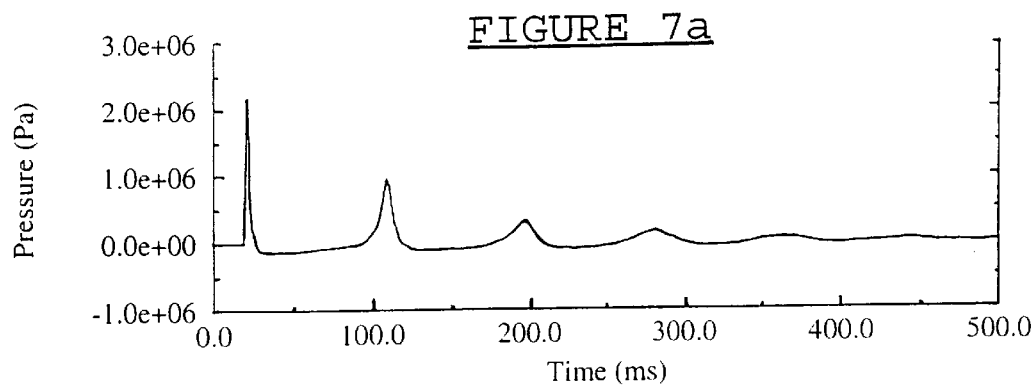
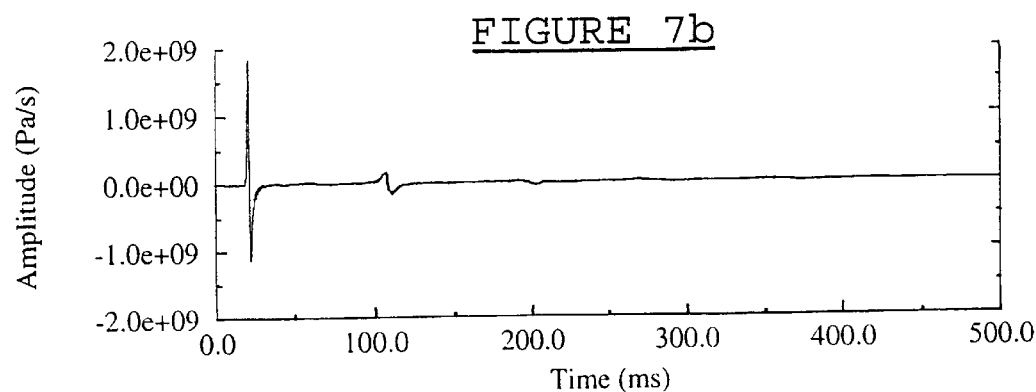
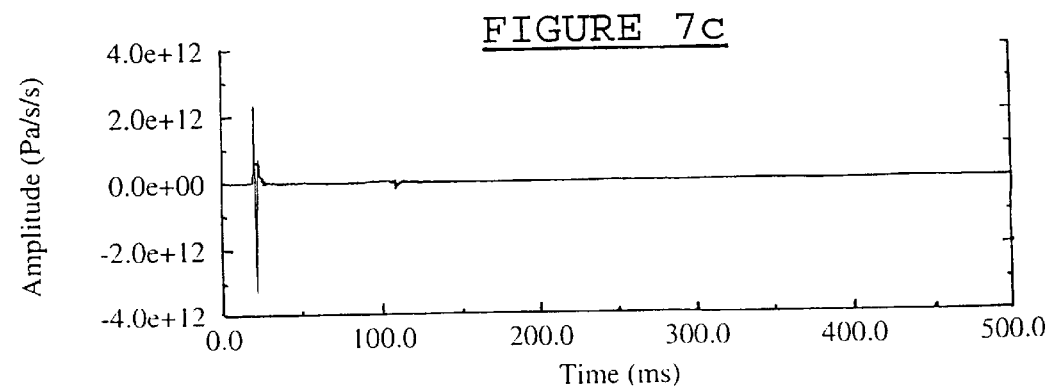

SIGNATURES OF MARINE SEISMIC SOURCES

This invention relates to a method of determining the far-field signature of at least one marine seismic source and to apparatus for use in such a method.

In seismic exploration in a marine environment it is known to generate seismic pulses or waves from at least one seismic source and to measure or record the wavefield. Marine seismic sources commonly comprise a plurality of air guns arranged in an array to produce a combined seismic source which has more desirable characteristics than the individual sources of the array. In use each air gun generates a high pressure air bubble by the sudden discharge of a quantity of high pressure compressed air into the water. The elasticity of the air couples with the inertial mass of the surrounding water to produce an oscillating system as the air expands and contracts in size until its energy is dissipated in the water and the bubble reaches its equilibrium volume. These bubble oscillations generate spherical sound waves which form the seismic signal.

An array of marine seismic sources transmits a sound wave through the body of water which is directional, i.e. the shape or signature of the transmitted wave varies with direction. This is as a result of the array having dimensions which are not small compared with the wavelengths of sound in the transmitted wave. This contrasts with the individual elements of the array which are normally very small compared with these wavelengths and thus behave like point sources, i.e. the wave transmitted by any individual element has spherical symmetry and has the same shape in all directions.

The signature of an array of seismic sources varies according to the distance from the array. In a given direction, the signature of a transmitted wave varies in the so-called "near field" as the distance from the array increases until at a sufficient distance from the array, in the so-called "far field", the shape of the wave results substantially constant but the amplitude decreases, generally inversely in proportion to the distance from the array. The "far field" of an array generally exists at distances greater than $D^2/\lambda$, where $D$ is the dimension of the array and $\lambda$ is the wavelength.

In U.S. Pat. No. 4,476,553, there is disclosed the use of an array of near-field hydrophones or pressure sensors arranged to measure the seismic signal generated by an array of air gun seismic sources in a marine body of water. Each hydrophone is placed no closer than about 1 m to an associated air gun so that the pressure measured at each hydrophone is a linear superposition of the spherical waves from all the oscillating bubbles. However this known system is expensive to implement and has the attendant problems of positioning the hydrophones accurately relative to the air gun, of calibrating the hydrophones and of transmitting the signals from the underwater hydrophones to the surface of the body of the water.

A known seismic source air gun made by Bolt Technology Corporation is disclosed in U.S. Pat. No. 4,240,518 and incorporates a stainless steel pressure sensor, known as the BSS, which is mounted within the air gun to measure the pressure inside the gun, as shown in FIG. 1. Hereinafter, such a seismic source air gun will be referred to as a "Bolt air gun". When the air gun fires, the air pressure in the gun changes, the change is measured by the sensor, and the sensor signal is sent back to the towing vessel. With an array of air guns it is important to ensure that all the guns fire at the same time and the signals from the pressure sensors on the different guns are used not only to measure the firing instant, or "time-break", of each gun but are also used as input to the gun controller, which adjusts the timing of the firing commands to the individual guns.

An aim of the present invention is to enable the signature of at least one marine seismic source to be predicted at a location remote from the at least one seismic source by measuring the pressure close to, e.g. at distances of under 1 m from, the at least one marine seismic source. These pressure measurements require both linear and non-linear components to be taken account of to obtain an accurate prediction of the signature.

In its broadest aspect, the present invention enables the processing of a signal from a pressure-measuring device, such as a BSS, mounted on a marine seismic source. When a suitable calibration has been effected, the pressure measurements are used to predict the pressure field produced by the seismic source at a relatively large distance therefrom.

According to one aspect of the present invention there is provided a method of predicting the signature of a marine seismic source operating in a marine body of water, the method being as claimed in the ensuing claim 1. Conveniently the pressure measuring means is positioned close to, e.g. less than 1 m from, the marine seismic source and is engulfed by the gas bubble during said interval of time so that the pressure signals are representative of both water and gas pressures.

According to another aspect of the present invention there is provided a method of predicting the signature of an array of marine seismic sources in a marine body of water, the method being substantially as claimed in the ensuing claim 6. Conveniently each pressure measuring means is positioned close to, e.g. less than 1 m from, its associated marine seismic source, the pressure measuring means being engulfed by the gas bubble generated by its associated marine seismic source during said interval of time so that the pressure signals are representative of both water and gas pressures.

According to a further aspect of the present invention there is provided marine seismic source apparatus as claimed in the ensuing claim 14.

An advantage of the present invention over the known methods is that the or each pressure measuring device is mounted on its associated seismic source. Thus the position of the pressure measuring device with respect to the seismic source, e.g. with respect to the gun port of a seismic source air gun, is known at all times. In prior art methods there is uncertainty in this positional relationship, especially at the instant of firing a seismic source air gun. By positioning the pressure measuring device close to the seismic source, it is necessary to take non-linear components into consideration when determining the signature of the at least one source. Also it is necessary to take into account the likelihood that the pressure-measuring device associated with a marine seismic source will quickly be engulfed by a bubble generated by the seismic source after firing of the source and that different considerations apply when the pressure-measuring device is inside or outside the bubble.

Conveniently the or each pressure-measuring device may comprise a BSS configured to measure the pressure outside an air gun.

In an array of guns there should be at least one pressure measurement per gun. It is possible to use a mixture of guns including, for example Bolt air guns equipped with the BBS, and other guns each with a near field hydrophone. It is conceivable that a device to measure the particle velocity or particle acceleration could be used in addition, or on its own.

Embodiments of the invention will now be described, by way of example only, with particular reference to the accompanying drawings, in which:

FIGS. 7a, 7b and 7c are plots showing, respectively, the pressure signal, the first derivative of the pressure signal and the second derivative of the pressure signal of the pressure sensor of FIG. 2;

Figure 1:
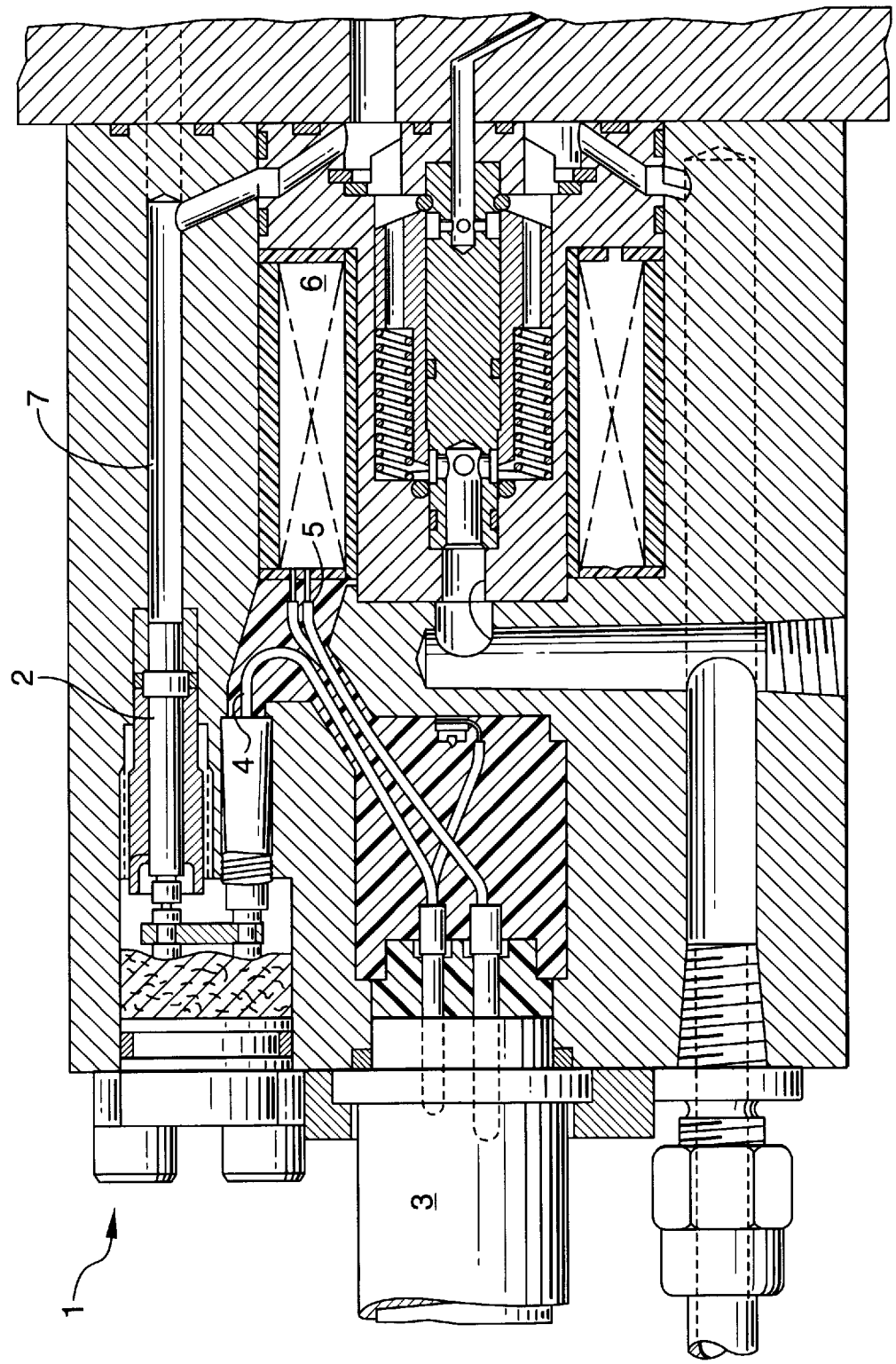
FIG. 1 is a sectional view of an air gun fitted with a pressure sensor for measuring air pressure within the air gun.

FIG. 1 shows part of a conventional Bolt air gun 1 as described in U.S. Pat. No. 4,240,518. The operation of the air gun is well known and is fully described in U.S. Pat. No. 4,240,518. In particular, the air gun 1 includes a pressure transducer or sensor 2 housed in a sensor passage 7 in the air gun housing and which is present to sense a surge in air or fluid pressure within the air gun occasioned by the firing of the air gun. An electric cable (not shown) from a vessel (not shown) is connected to the air gun via a connector 3 and includes wires 4 and 5 for connection to the pressure sensor 2 and a solenoid winding 6, respectively.

Figure 2:
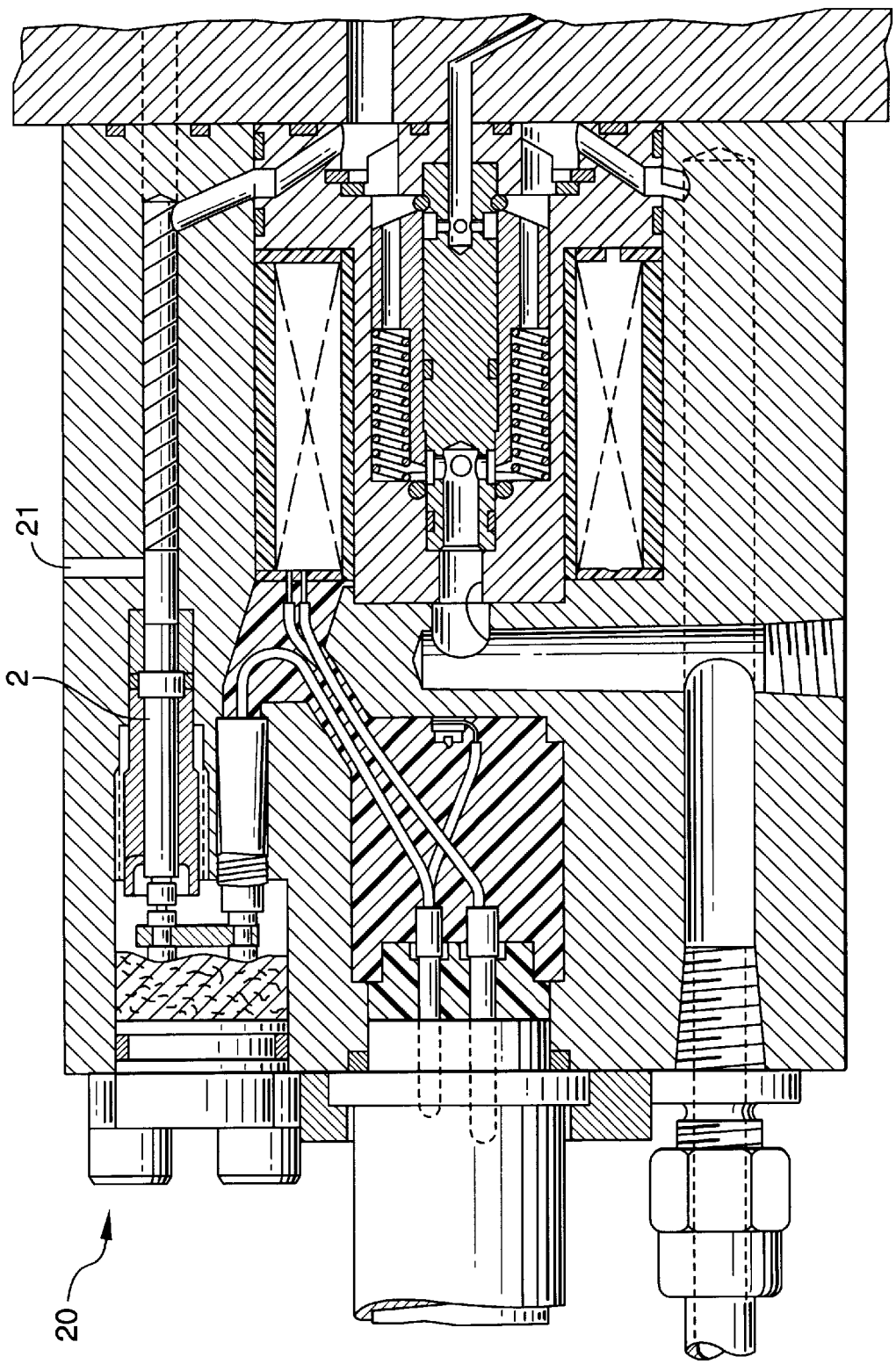
FIG. 2 is a modified sectional view of the air gun shown in FIG. 1 in which the pressure sensor is configured to measure air and water pressures outside the air gun.

FIG. 2 shows part of a modified Bolt air gun 20 in which an additional passageway 21 is formed in the housing of the air gun to place the passage 7 in communication with the outside. In use, the pressure sensor 2 is thus able to sense the pressure existing immediately outside the sensor. The rest of the passageway 7 is blocked so that measurements obtained from the sensor are not contaminated by the pressure variations occurring simultaneously inside the air gun. The outlet of the passageway 21 is positioned close to the air gun bubble port (not shown) so as to be engulfed by an air bubble soon after an air bubble is transmitted into the water. In a pressure measuring cycle, the pressure sensor will thus measure water pressure for a short initial period and then the air pressure within the air bubble when the air bubble engulfs the sensor 2. The sensor should conveniently be positioned under 1 m, typically under 0.5 m, from the bubble port of the air gun 20. By mounting the pressure sensor on the air gun in a fixed position, a precise, known geometric arrangement exists between the sensor and the air gun bubble port. Therefore it is unnecessary to calibrate or measure the precise distance between the sensor and bubble port for each application.

The theory is considered below and is illustrated using measurements made on a single Bolt air gun with the BSS positioned as shown in FIG. 2. The theory is also considered when applied to an array of air guns.

Theory for a Single Gun

Consider first the pressure field produced by the bubble emitted by a single air gun. The diameter of the oscillating air bubble is known to be small compared with the wavelengths of seismic radiation it produces, and therefore the bubble appears to behave as an acoustic monopole with a spherically-symmetric wavefield. In this analysis the effect of gravity and the water surface are ignored.

The equation of motion for radial flow about the centre of an oscillating bubble is $$-\frac{1}{\rho}\frac{\partial p}{\partial r} = \frac{\partial v}{\partial t} + v\frac{\partial v}{\partial r}, \qquad (1)$$

in which r is the radial distance from the centre of the bubble. t is time, p(r,t) is the pressure, $\rho$ is the density of water and is assumed to be constant, and v(r,t) is the particle velocity of the water. In this application the nonlinear term $v^{\delta v}/_{\delta r}$ is not negligible and must be included in the analysis. It becomes negligible about 1 m from the bubble. This distance is a function of the gun volume, pressure, and depth. Because the radical flow is irrotational, the particle velocity may be expressed as the gradient of a velocity potential:

$$v(r,t) = -\frac{\partial \phi(r,t)}{\partial r}. \qquad (2)$$

Using this expression in (1) and integrating with respect to r yields $$\frac{p(r,t) - p_\infty}{\rho} = \frac{\partial \phi(r,t)}{\partial t} - \frac{v^2(r,t)}{2}, \qquad (3)$$

in which $\rho_\infty$ is hydrostatic pressure.

In equation (3) p(r,t)−p∘ is the pressure variation at a distance r from the centre of the bubble. The water can be considered to be linearly compressible in the range of pressures that exist close to normal air guns, including Bolt air guns, and it can be shown that the particle velocity potential must then propagate radially outwards, approximately with the speed of sound c, its amplitude decaying inversely with the distance r:

$$\phi(r,t) = \frac{1}{r}f\left(t - \frac{r}{c}\right). \qquad (4)$$

ƒ(t) has the dimensions of volume divided by time and is in fact the rate of change of the volume of the oscillating bubble. From (2) and (4) it follows that the particle velocity has the following form:

$$v(r,t) = \frac{1}{r^2}f\left(t-\frac{r}{c}\right) + \frac{1}{rc}f'\left(t-\frac{r}{c}\right), \quad (5)$$

while the pressure can be expressed $$\frac{p(r,t) - p_\infty}{\rho} = \frac{1}{r}f'\left(t-\frac{r}{c}\right) - \frac{v^2(r,t)}{2} \quad (6)$$

in which the first term on the right hand side is linear and the second term is nonlinear.

In order to be able to calculate the pressure at any point in the water the function $f(t)$ and its time derivative $f'(t)$ must be known. Once these are known, the particle velocity at any point a distance r from the centre of the bubble can be calculated using equation (5), and the pressure may then be calculated using equation (6). The objective, therefore, is to determine $f(t)$ and its time derivative $f'(t)$ from the pressure measurement.

Initially the pressure sensor is outside the bubble and the sensor measures the change in water pressure given by equation (6). After a few milliseconds the bubble expands to include the pressure sensor, which then measures the pressure variation on the inside of the bubble. The point in time at which this occurs can be determined if the radius of the bubble is known. Since the wave function $f(t)$ is the time derivative of the bubble volume, it can be integrated to determine the volume and hence the bubble radius.

Once inside the bubble equation of motion of the bubble derived by Gilmore (F. R. Gilmore, 1952, "Collapse of a spherical bubble"—Report No. 26-4, Hydrodynamics Laboratory, California Institute of Technology, Pasadena, Calif.) can be used to determine the bubble motion from the measured pressure, and hence the functions $f(t)$ and $f'(t)$.

The steps of the method are given below, illustrated with measurements of the pressure made for a 145 cu. in. Bolt air gun at a depth of 6 m. The goal is to determine the pressure at any arbitrary distance $r_N$ from the centre of the bubble, starting with a measurement made at a known radius r.

Determination of the Wave Function from the Near Field Pressure Measurement

Figure 3:
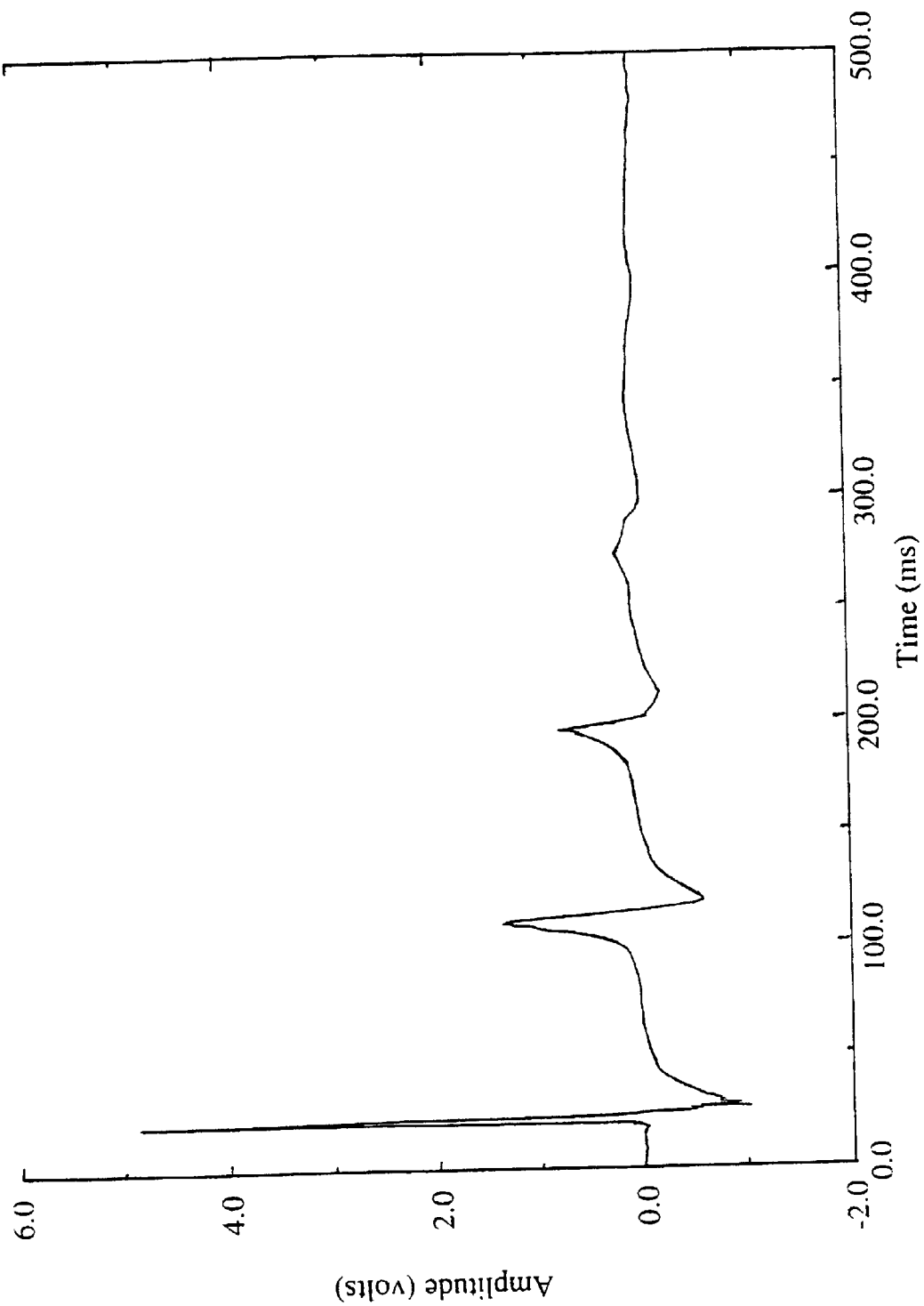
FIG. 3 is a plot showing the output response of the pressure sensor of FIG. 2 when measuring pressures generated by a marine seismic source.
Figure 4:
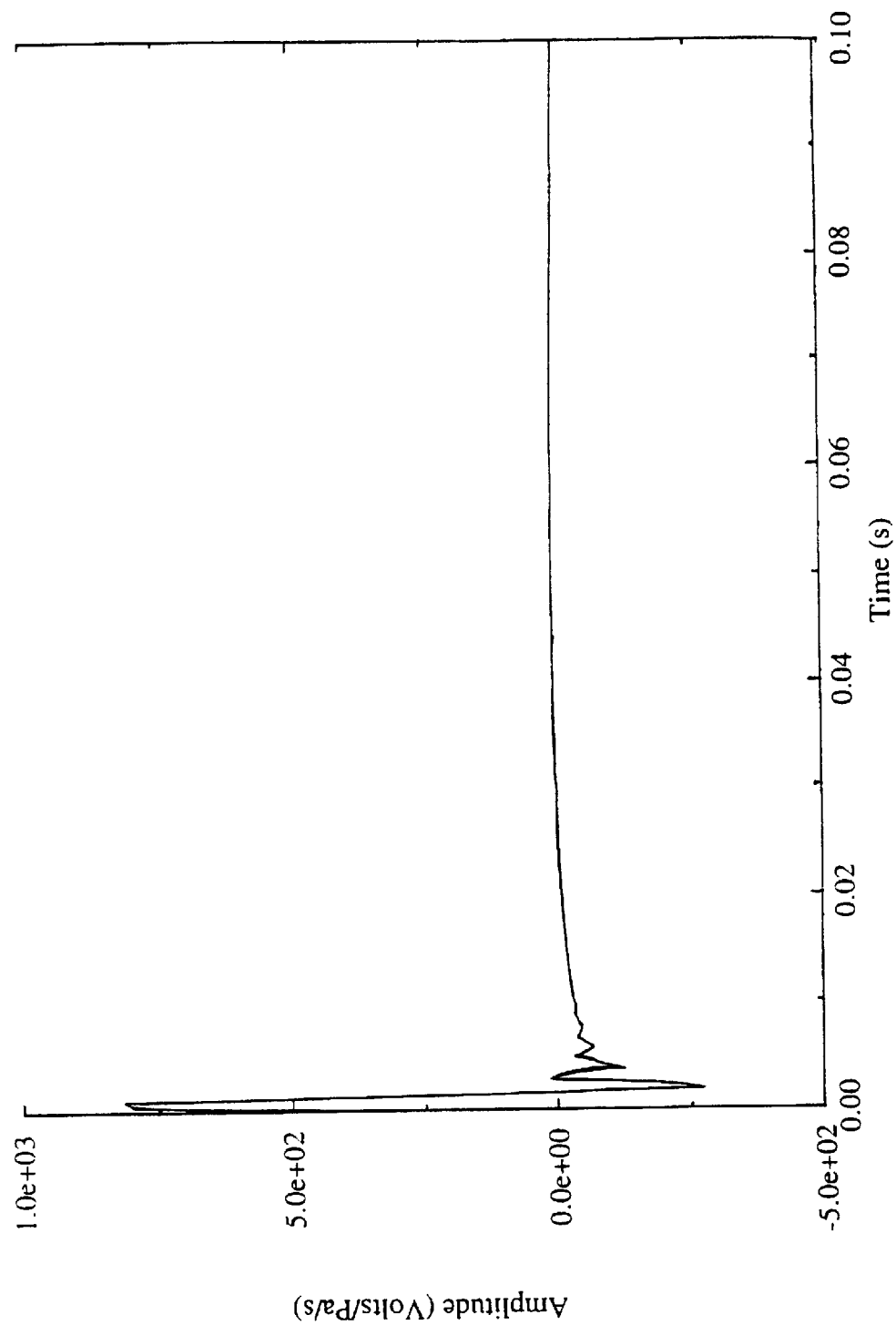
FIG. 4 shows an impulse and recording system response of the pressure sensor of FIG. 2.
Figure 5A:
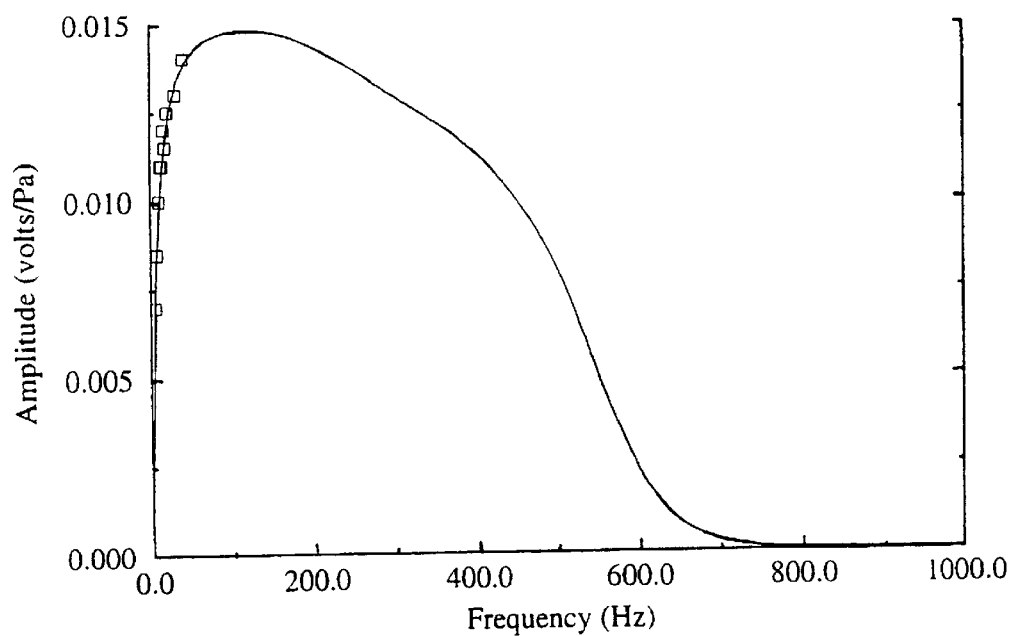
FIG. 5a shows the amplitude spectrum of the pressure sensor of FIG. 2 and recording system response with calibration points marked.
Figure 5B:
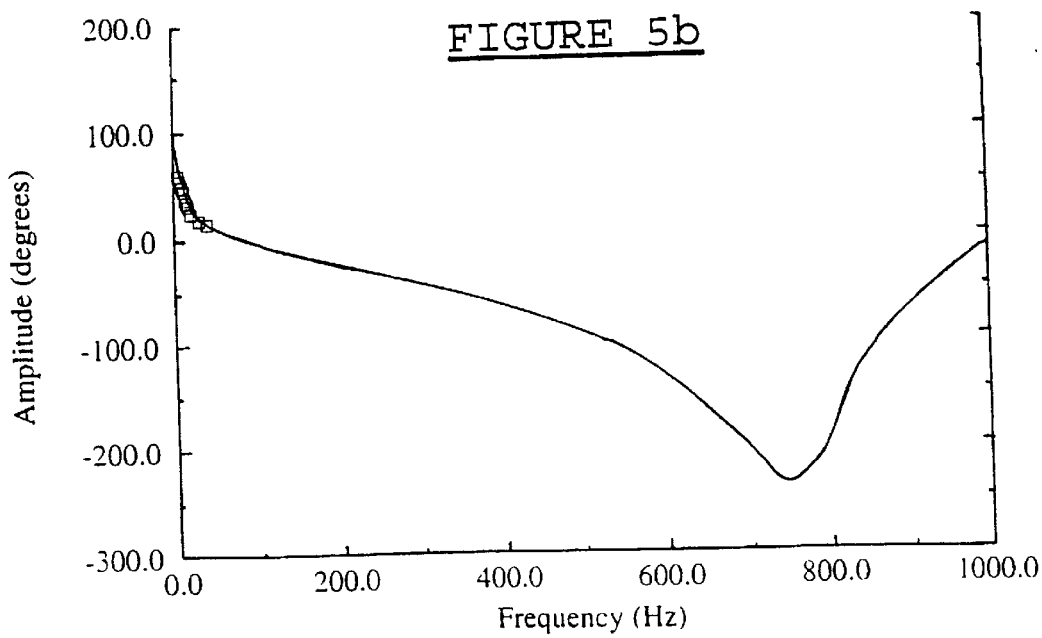
FIG. 5b shows the phase spectrum of the pressure sensor of FIG. 2 and recording system response with calibration points marked.
Figure 6:
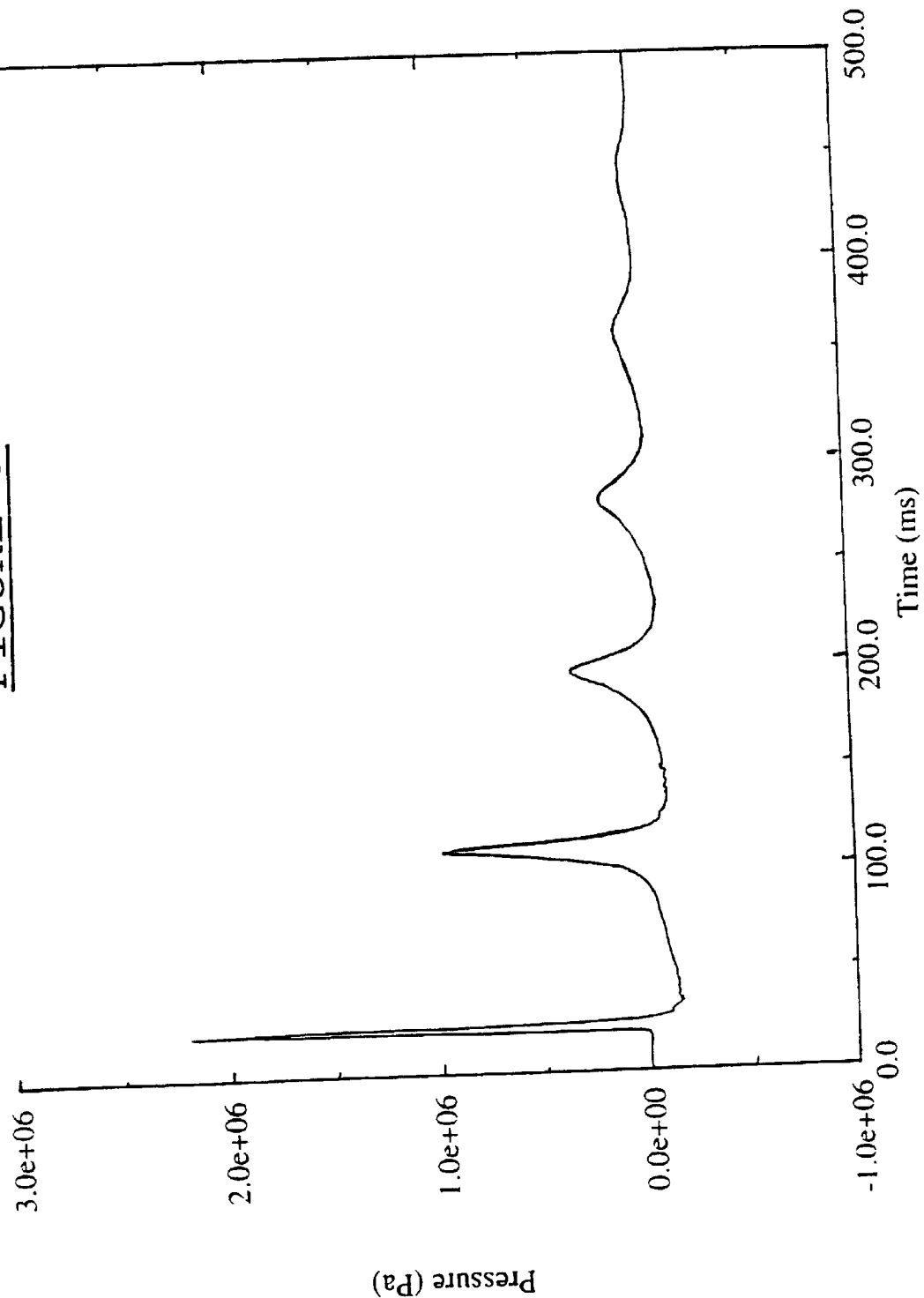
FIG. 6 is a plot of the pressure signal of the pressure sensor of FIG. 2.

A pressure measurement is made very close to the gun port using, in this case, the BSS. FIG. 3 shows this measurement, which is actually a series of discrete samples at a sampling interval of 0.488 ms. The vertical scale is volts. The impulse response of the BSS and its recording system is shown in FIG. 4. This was calculated from a calibration of the BSS, and FIG. 5 shows the calibration data as small squares plotted against the full response over the complete bandwidth. FIG. 3, the recorded voltage, is the convolution of the true pressure with the impulse response of the BSS and its recording system, FIG. 4. To determine the true pressure variation $p(r,t)-p_\infty$ from the recording this measurement is deconvolved for the impulse response of the measurement system. This yields the sampled pressure variation signal p(i), shown in FIG. 6.

The first and second time derivatives of this measurement p'(i) and p''(i), respectively, are required for the recursive integration scheme described below and are calculated using a conventional finite-difference scheme. They are shown, together with p(i), in FIG. 7.

The integration scheme using the Taylor expansion. Initially the pressure measuring device is outside the bubble. The computation of the pressure at the computation point is recursive, sample-by-sample in the time domain, starting with two initial values which are essentially constants of integration: v(1) the initial value of the particle velocity of the water at the measuring device (in this case the BSS): and $V_B(1)$ the initial volume of the bubble. These two quantities must be determined by a separate calibration experiment for the gun under consideration. This experiment requires a pressure measurement at a second point a different distance from the first device. The two initial values are found by trial and error (in other words, this is an optimisation problem) until the pressure calculated at the second measurement point matches the pressure measured at that point. The calibration experiment is described later.

While the pressure measurement device is outside the bubble the recursion may proceed as follows:

Initialisation

Initialisation is triggered by the arrival of the pressure wave. The first significant sample is p(1). The initial value of the particle velocity at the measurement point v(1) and the initial value of the bubble volume $V_B(1)$ are known from a separate calibration experiment.

Hydrostatic pressure is $$p_\infty = p_{ATM} + \rho g^{b_z}, \quad (7)$$

in which $p_{ATM}$ is atmospheric pressure, $\rho$ is the density of water, g is the acceleration due to gravity, and $^b z$ is the depth to the centre of the gun ports.

The first time derivative of the wave function is $$f'(1) = \frac{rp(1)}{\rho} \quad (8)$$

The initial bubble radius is $$r_B(1) = \left(\frac{3V_B(1)}{4\pi}\right)^{\frac{1}{3}} \quad (9)$$

The initial value of the wave function is $$f(1) = \frac{r^2}{c}\left[cv(1) - \frac{p(1)}{\rho} - \frac{v^2(1)}{2}\right]. \quad (10)$$

Recursive Integration Scheme

The following integration scheme is accurate to the second derivative of the particle velocity. It follows that the second and third derivatives of the wave function are required, which in turn require the first and second derivatives of the measured pressure to be known, as mentioned above. The proposed scheme (which can easily be turned into a computer program) is as follows, starting with i=1:

Particle velocity at the bubble wall $$v_B(i) = \frac{f(i)}{r_B^2(i)} + \frac{f'(i)}{r_B(i)c} \quad (11)$$

Particle velocity at the computation point $$v_N(i) = \frac{f(i)}{r_N^2} + \frac{f'(i)}{r_N c} \qquad (12)$$

Enthalpy at the bubble wall $$H(i) = \frac{f'(i)}{r_B} - \frac{v_B^2(i)}{2} \qquad (13)$$

Absolute pressure in the bubble $$p_B(i) = \rho H(i) + p_\infty \qquad (14)$$

Pressure at the computation point $$p_N(i) = \rho\left[\frac{f'(i)}{r_N} - \frac{v_N^2(i)}{2}\right] \qquad (15)$$

Second time derivative at the wave function $$f''(i) = \left[\frac{rp'(i)}{\rho} + \frac{v(i)f'(i)}{r}\right] / \left(1 - \frac{v(i)}{c}\right) \qquad (16)$$

First time derivative of the particle velocity at the measurement point $$v'(i) = \frac{f'(i)}{r^2} + \frac{f''(i)}{rc} \qquad (17)$$

Third time derivative of the wave function $$f'''(i) = \left[\frac{rp''(i)}{\rho} + rv'(i)v'(i) + \frac{v(i)f''(i)}{r}\right] / \left(1 - \frac{v(i)}{c}\right) \qquad (18)$$

Second time derivative of the particle velocity at the measurement point $$v''(i) = \frac{f''(i)}{r^2} + \frac{f'''(i)}{rc} \qquad (19)$$

New particle velocity at the measurement point $$v(i+1) = v(i) + v'(i)\Delta t + v''(i)\frac{\Delta t^2}{2} \qquad (20)$$

New first derivative of the wave function $$f'(i+1) = \frac{rp(i+1)}{\rho} + \frac{rv(i+1)v(i+1)}{2} \qquad (21)$$

New wave function $$f(i+1) = \frac{r^2}{c}\left[cv(i+1) - \frac{p(i+1)}{\rho} - \frac{v^2(i+1)}{2}\right] \qquad (22)$$

New bubble volume $$V_B(i+1) = V_B(i) + 4\pi\left[f(i)\Delta t + f'(i)\frac{\Delta t^2}{2} + f''(i)\frac{\Delta t^3}{6} + f'''(i)\frac{\Delta t^4}{24}\right] \qquad (23)$$

New bubble radius $$r_B(i+1) = \left(\frac{3V_B(i+1)}{4\pi}\right)^{\frac{1}{3}} \qquad (24)$$

Now return to (11), incrementing i by one, unless $$r_B(i+1) \geq r. \qquad (25)$$

If this inequality is satisfied, it means that the bubble has expanded so much that the pressure measurement is now being made inside the bubble in which the pressure is assumed to be uniform (Ziolkowski, A. M., 1970, "A method for calculating the output pressure waveform from an air gun", Geophys. J.R. Astr. Soc., 21,137–161). The equation of motion must now be used to compute the motion of the bubble, the wave function, and the pressure at the computation point. Incrementing i by one, the recursion proceeds as follows:

Particle velocity at the bubble wall $$v_B(i) = \frac{f(i)}{r_B^2(i)} + \frac{f'(i)}{r_B(i)c} \qquad (26)$$

Particle velocity at the computation point $$v_N(i) = \frac{f(i)}{r_N^2} + \frac{f'(i)}{r_N c} \qquad (27)$$

Enthalpy at the bubble wall $$H(i) = \frac{f'(i)}{r_B} - \frac{v_B^2(i)}{2} \qquad (28)$$

Absolute pressure in the bubble $$p_B(i) = \rho H(i) + p_\infty \qquad (29)$$

Pressure at the computation point $$p_N(i) = \rho\left[\frac{f'(i)}{r_N} - \frac{v_N^2(i)}{2}\right] \qquad (30)$$

Second time derivative of the wave function $$f''(i) = \left[\frac{rp'(i)}{\rho} + \frac{v(i)f'(i)}{r}\right] / \left(1 - \frac{v(i)}{c}\right) \qquad (31)$$

Total derivative of the enthalpy $$\frac{DH(i)}{Dt} = \frac{p'(i)}{\rho} \tag{32}$$

Second total derivative of the enthalpy $$\frac{D^2H(i)}{Dt^2} = \frac{p''(i)}{\rho} \tag{33}$$

Equation of motion (Gilmore, 1952; Ziolkowski, 1970)

$$\frac{Dv_B(i)}{Dt} = \frac{\left[H(i)\left(1+\frac{v_B(i)}{c}\right) + \frac{r_B(i)}{c}\frac{DH(i)}{Dt}\left(1-\frac{v_B(i)}{c}\right) - \frac{3}{2}v_B^2(i)\left(1-\frac{v_B(i)}{3c}\right)\right]}{r_B(i)\left(1-\frac{v_B(i)}{c}\right)} \tag{34}$$

Simplified total time derivative of the equation of motion $$\frac{D^2v_B(i)}{Dt^2} = \frac{1}{r_B(i)}\frac{DH(i)}{Dt} - \frac{H(i)}{r_B^2(i)} + \frac{1}{c}\frac{DH(i)}{Dt} + \tag{35}$$
$$\frac{r_B(i)}{c}\frac{D^2H(i)}{Dt^2} - 3v_B(i)\frac{Dv_B(i)}{Dt}$$

New bubble radius $$r_B(i+1) = r_B(i) + v_B(i)\Delta t + \frac{Dv_B(i)}{Dt}\frac{\Delta t^2}{2} + \frac{D^2v_B(i)}{Dt^2}\frac{\Delta t^3}{6} \tag{36}$$

New bubble wall velocity $$v_B(i+1) = v_B(i) + \frac{Dv_B(i)}{Dt}\Delta t + \frac{D^2v_B(i)}{Dt^2}\frac{\Delta t^2}{2} \tag{37}$$

New derivative of wave function $$f'(i+1) = \frac{r_B(i+1)p(i+1)}{\rho} + \frac{r_B(i+1)v_B^2(i+1)}{2} \tag{37}$$

New wave function $$f(i+1) = \frac{r_B^2}{c}\left[cv_B(i+1) - \frac{p(i+1)}{\rho} - \frac{v_B^2(i+1)}{2}\right] \tag{38}$$

At this point return to (26) unless $$r_B(i+1) < r. \tag{39}$$

If this inequality is satisfied return to (11). The process stops at the end of the pressure signal.

Figure 8A:
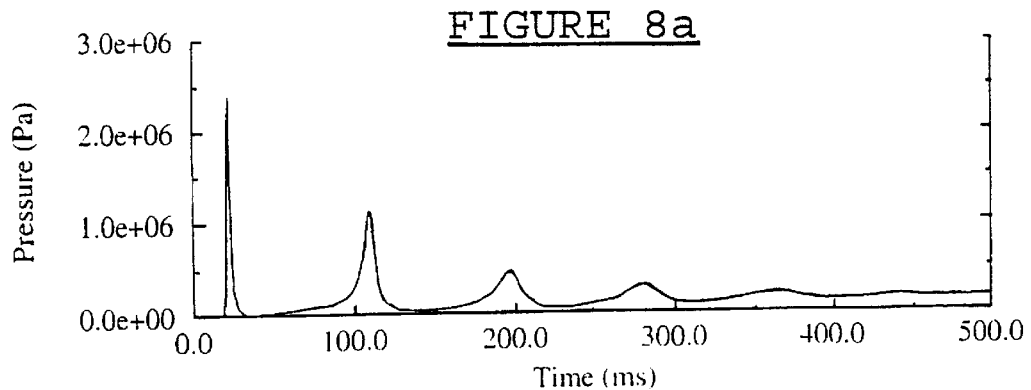
FIGS. 8a, 8b and 8c show plots, respectively, of the bubble pressure, bubble volume and bubble radius of a bubble generated by a marine seismic source.
Figure 8B:
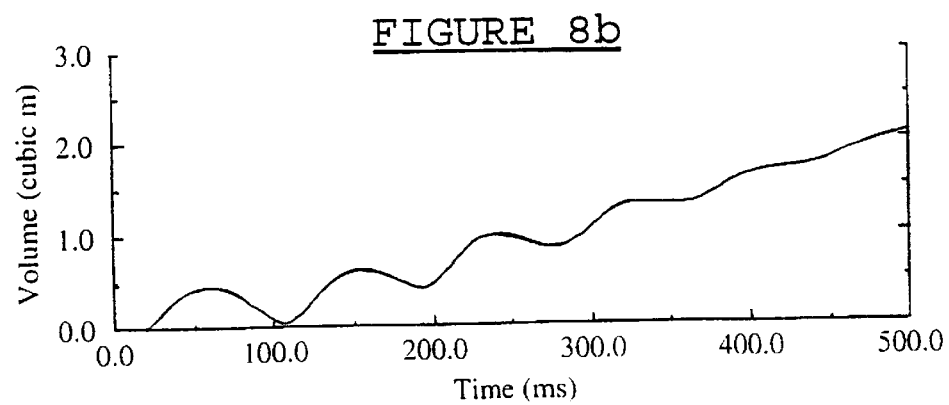
Figure 8C:
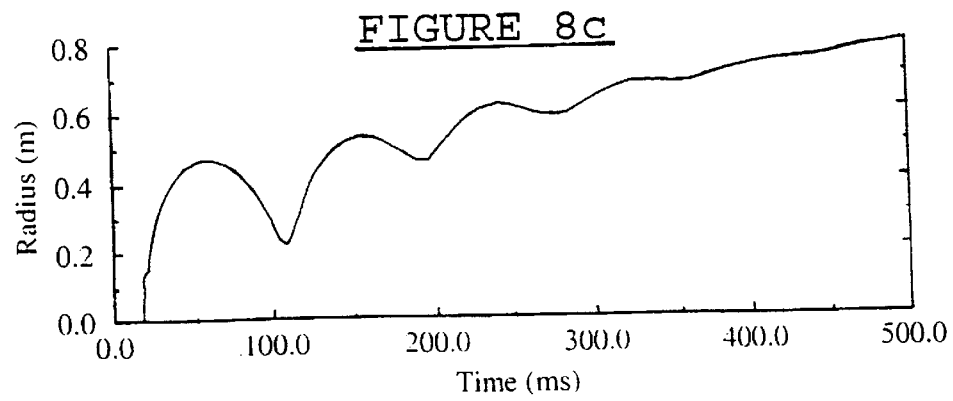
Figure 9A:
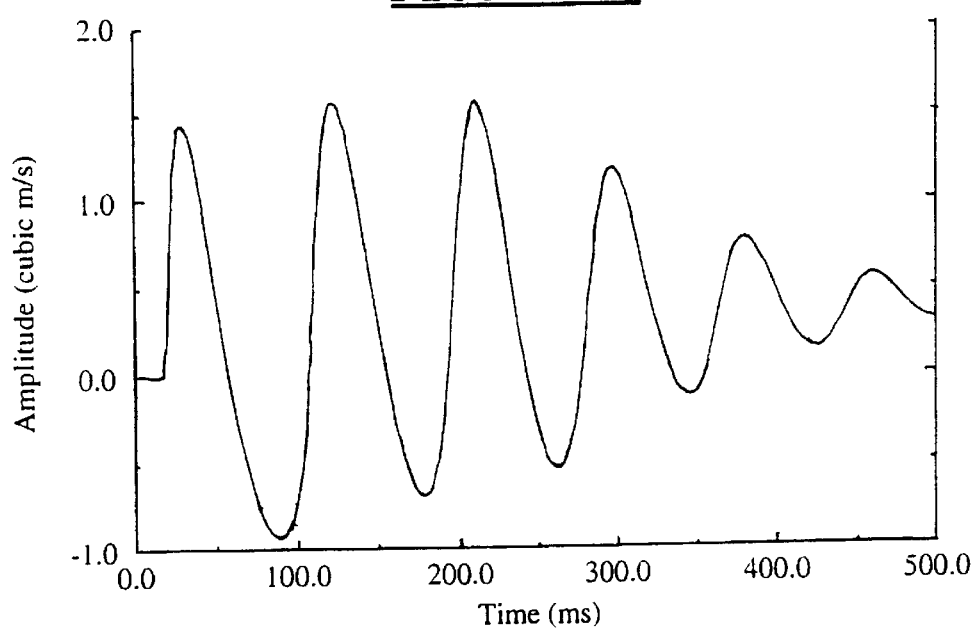
FIGS. 9a and 9b are plots showing the wave function and its first derivative, respectively, of a wave generated by a marine seismic source.
Figure 9B:
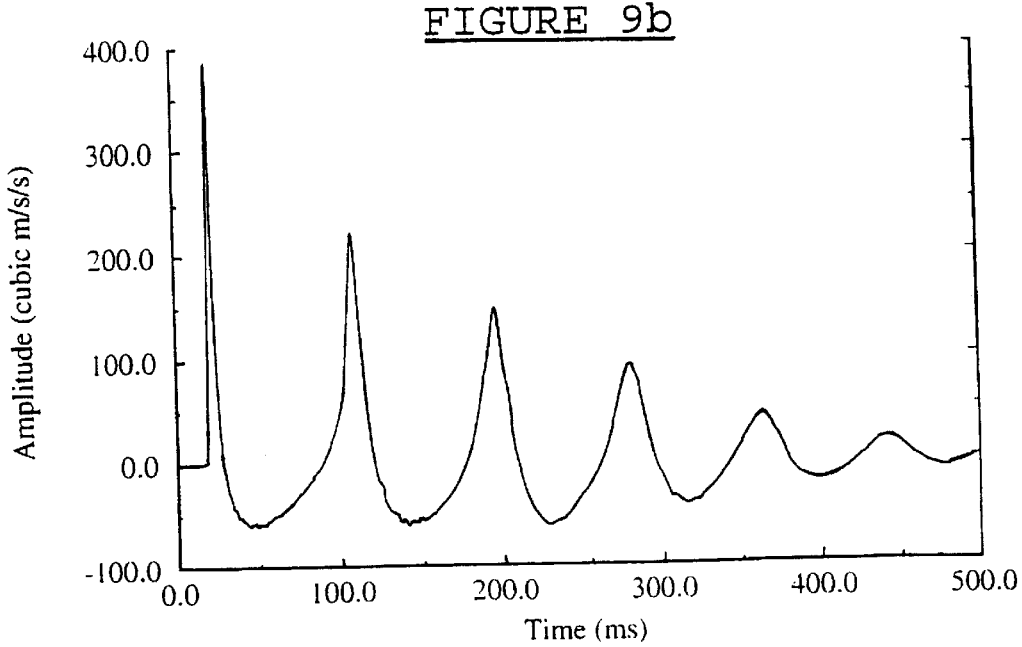
Figure 10:
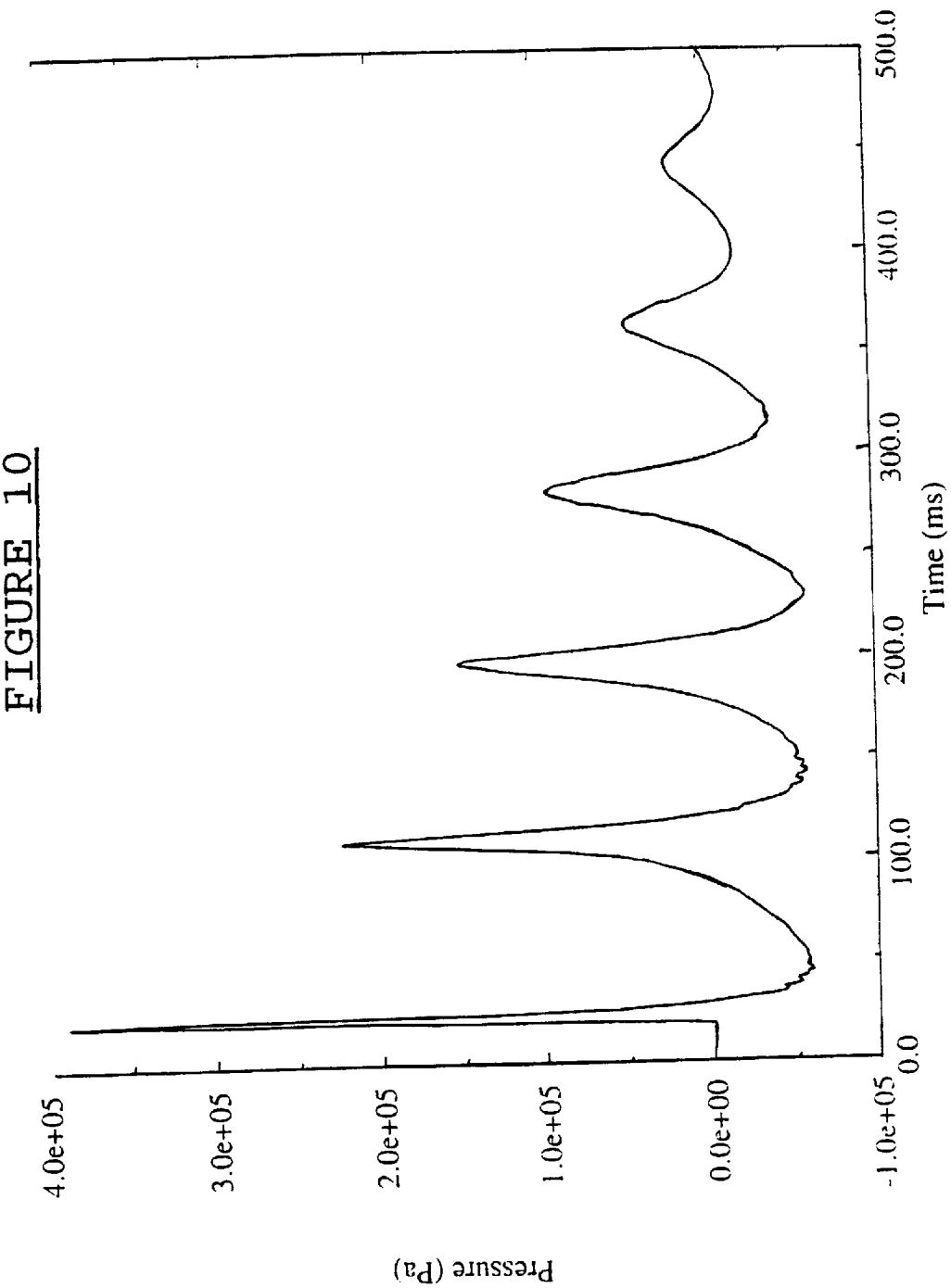
FIG. 10 is a plot showing the water pressure at 1 m from a marine seismic source.

Many functions have to be calculated on the way to determining the two sampled functions $f(i)$ and $f'(i)$. FIG. 8 shows the bubble pressure, bubble volume and bubble radius as a function of time. The BSS device was 0.16 m from the centre of the gun ports and was inside the bubble continuously after the first few milliseconds. FIG. 9 shows the wave function $f(t)$ and its first derivative $f'(t)$.

The nonlinear contribution to the pressure signal in equation (6) is proportional to the square of the particle velocity. From equation (5) it is seen that the particle velocity is inversely proportional to the square of the distance for distances small compared with a wavelength. Therefore the nonlinear term decreases inversely proportional to the fourth power of the distance from the centre of the bubble. Beyond some small distance from the centre of the bubble this nonlinear term becomes negligible and only the linear term is important. FIG. (10) shows the pressure at 1 m from the centre of the bubble, calculated using both the linear and nonlinear contributions, according to equation (6). But the shape of the waveform is indistinguishable from $f'(t)$, shown in FIG. (9), demonstrating that the nonlinear term is negligible at about 1 m from the bubble. It is for this reason that U.S. Pat. No. 4,476,553 requires the near field hydrophones to be placed no closer than about 1 m to any gun in the array.

Figure 11:
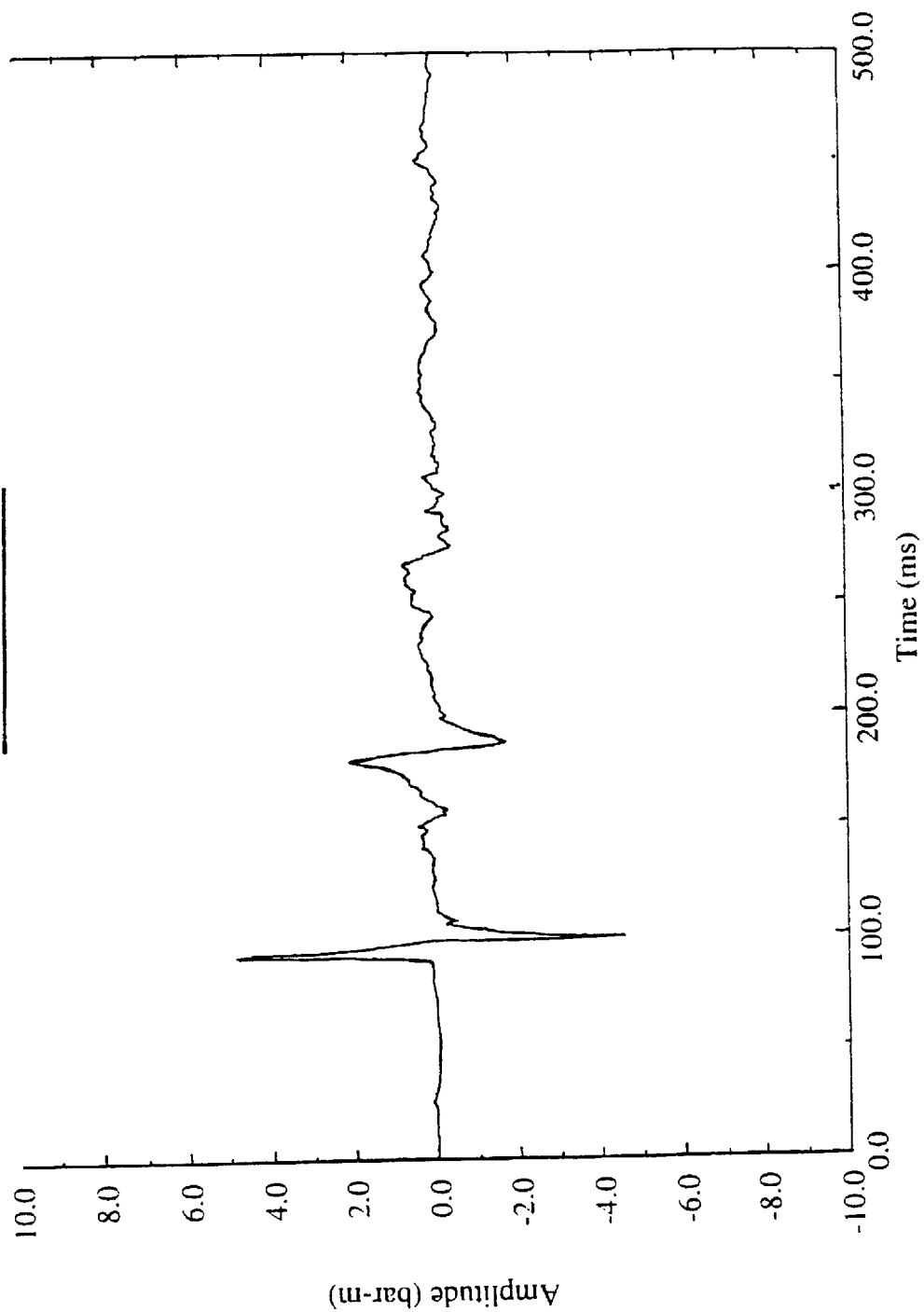
FIG. 11 is a plot showing wave measurement at a far-field pressure sensor.
Figure 12:
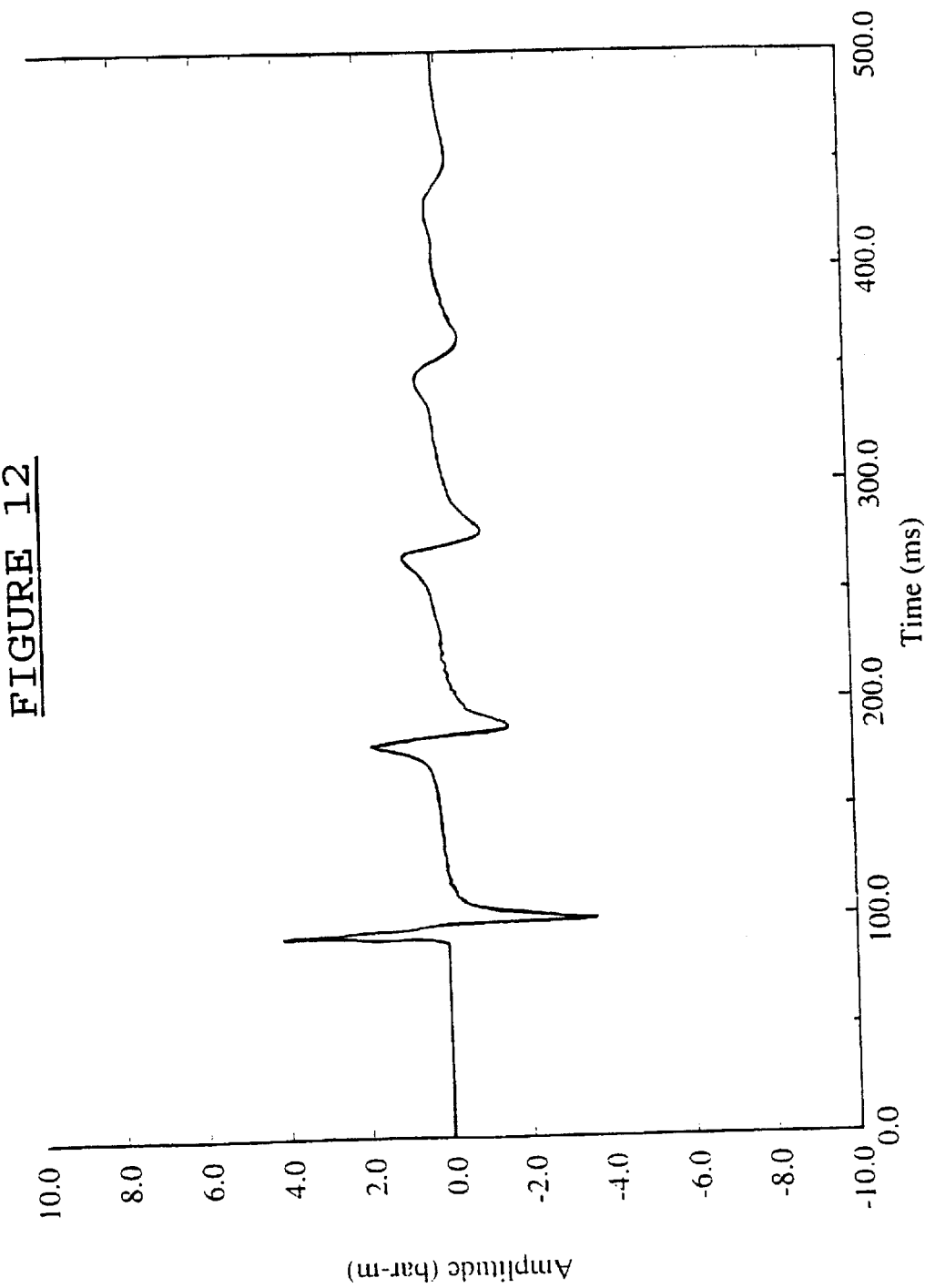
FIG. 12 is a plot computed from the pressure sensor of FIG. 2.

Far from the gun it is only the linear term that needs to be calculated. At the same time as the signal shown in FIG. 3 was measured, a far field hydrophone measurement was made, with the hydrophone 106 m vertically below the air gun. This measurement is shown in FIG. 11. The pressure at the hydrophone, multiplied by its distance from the gun is shown in FIG. 11 in units of bar-m. This signal can be computed using only the derivative of the wave function as follows:

$$r_f(p_f(t) - p_\infty) = f_j'\left(t - \frac{r_f}{c}\right) - \frac{r_f}{r_f + 2^b z} f_j'\left(t - \frac{r_f + 2^b z}{c}\right), \tag{40}$$

in which $r_f$ is the distance from the gun to the far field hydrophone, $p_f(t) - p_\infty$ is the pressure variation at the hydrophone, and $^bz$ is the depth of the gun delow the water surface. The second term on the right hand side of equation (40) is the reflection from the sea surface. The result of this calculation is shown in FIG. 12. This is very similar to FIG. 11, but differs in two aspects; first the amplitude; and second, in minor details of the waveform. We suspect the amplitude error could be caused by errors in the choice of the initial values $v(1)$ and $V_B(1)$. The extra detail in the measured signal is probably caused by reflections from objects in the lake in which the measurement was made. Apart from these minor differences, the agreement is very good and the invention works.

An Array of Guns Including Clusters (and Introducing the Sea Surface)

Consider now an array of n guns, some or all of which may be arranged in clusters. The sea surface is considered as a perfect reflector. The guns in clusters are considered to be far enough apart for the nonlinear component of the pressure wave from one gun to become negligible at the near field transducer of another gun. In practice this means that the distance between guns in a cluster is not less than about 0.5 m for small guns (say 20 cu. ins., or 0.31) or not less than about 1.0 m for large guns (say 400 cu. ins., or 61). These distances are approximate and depend on the gun pressure and depth and temperature of the water.

Figure 13:
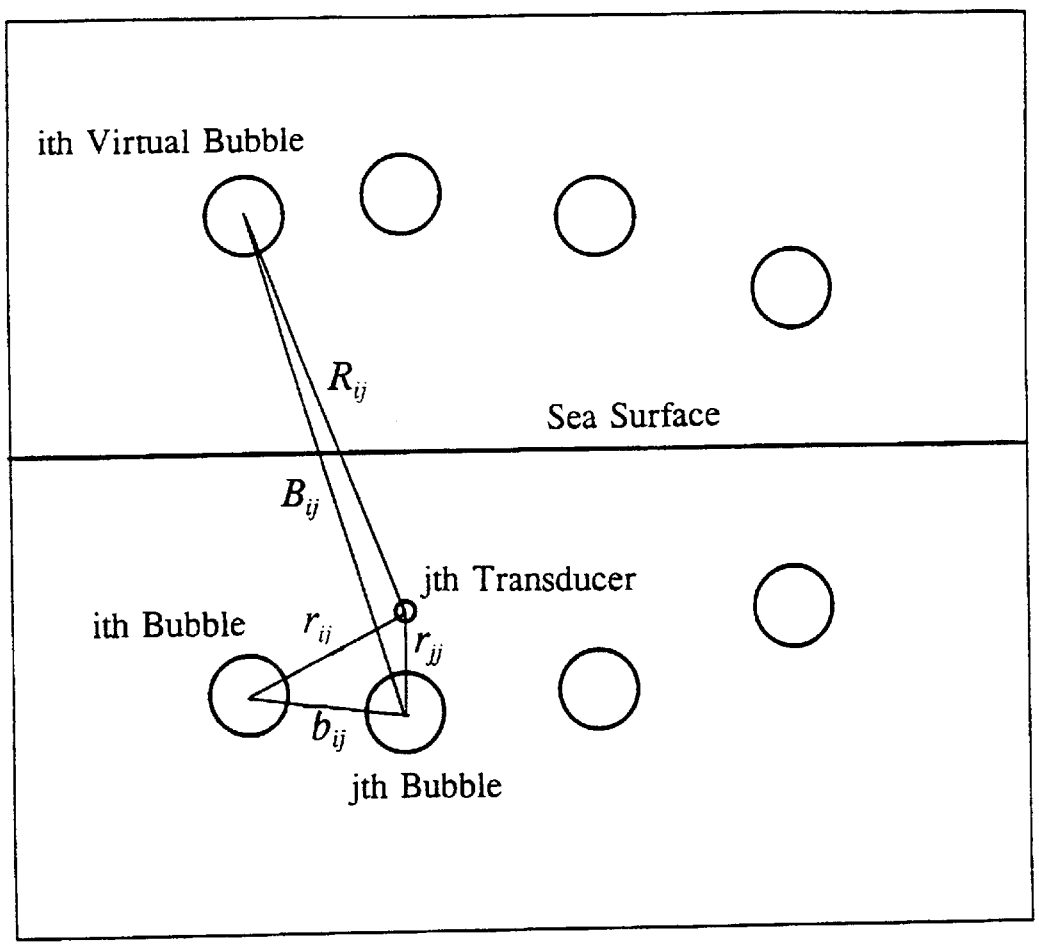
FIG. 13 is a diagram showing the configuration of air bubbles, their virtual images in the sea surface and the jth pressure transducer mounted on the jth air gun, the air guns not being shown.

Let the particle velocity potential of the ith gun be $$\phi_i(r,t) = \frac{1}{r}f_i\left(t - \frac{r}{c}\right), \tag{41}$$

in which the origin is at the centre of the ith bubble. Consider a pressure sensor mounted on the jth gun. FIG. 13 shows the configuration. Pressure is a scalar quantity and the pressure at this sensor is a superposition of the spherical waves from the air gun bubbles and their virtual images:

$$\frac{p_j(t) - p_\infty}{\rho} = \sum_{i=1}^n \frac{1}{r_{ij}} f'_i\left(t - \frac{r_{ij}}{c}\right) - \qquad (42)$$

$$\sum_{i=1}^n \frac{1}{R_{ij}} f'_i\left(t - \frac{R_{ij}}{c}\right) - \frac{v_j^2(t)}{2}, \quad j = 1, n,$$

in which $$v_j(t) = \frac{1}{r_{jj}^2} f_j\left(t - \frac{r_{jj}}{c}\right) + \frac{1}{r_{jj}c} f'_j\left(t - \frac{r_{jj}}{c}\right). \qquad (43)$$

In these equations $r_{jj}$ is the distance from the centre of the jth bubble to the jth pressure transducer, $r_{ij}$ is the distance from the centre of the ith bubble to the jth pressure transducer, $R_{ij}$ is the distance from the centre of the virtual image of ith bubble in the sea surface to the jth pressure transducer, the reflection coefficient at the water surface has been taken to be −1, and n is the number of guns in the array.

Each gun has its own pressure transducer, so equation (42) represents n pressure signals, each one being the superposition of the weighted and delayed linear components of the pressure fields from each of the bubbles and their sea surface reflections, plus the nonlinear component from the nearest gun.

Practical Considerations: Towed Arrays of Air Guns

In practice the array of air guns is towed through the water by the vessel. The bubbles produced by the air guns tend to rise due to their buoyancy. Thus there is relative motion between the gun-mounted pressure transducer (or BSS on a Bolt gun) and the centre of the bubble; r is therefore a function of time. In the above equations the variation of r with time in the argument $(t-r/c)$ is negligible, because the bubble rise velocities and the speed of the vessel through the water are both very small compared with the speed of sound c. That is, it has a negligible effect on the travel time of the signal. However, the effect of the variation of r with time on the amplitude must be taken into consideration.

The positions of the centres of the bubbles and the positions of the transducers are referred to a right-handed Cartesian coordinate system, whose origin is at the sea surface, with the x-axis pointing behind the vessel, and the z-axis pointing vertically downwards. At time t=0 the coordinates of the jth gun ports are $(^b x_j, ^b y_j, ^b z_j)$, and the coordinates of the jth gun pressure sensor are $(^t x_j, ^t y_j, ^t z_j)$. Let the jth gun fire at time $t_j$, and let the bubble rise with velocity $v_z$, which is assumed to be the same for all bubbles. Let the forward velocity of the air guns with respect to the water be $v_x$, which is the same for all guns. At time $t \geq t_j$, the distance of the pressure sensor of the jth gun from the centre of the ith bubble is $$r_{ij}(t) = [(^b x_i - \{^t x_j - v_x[t-t_i]\})^2 + (^b y_i - ^t y_j)^2 + (\{^b z_i - v_z[t-t_i]\} - ^t z_j)^2]^{1/2} \quad (44)$$

and the distance of the pressure sensor of the jth gun from the centre of the virtual image of the ith bubble is $$R_{ij}(t) = [(^b x_i - \{^t x_j - v_x[t-t_i]\})^2 + (^b y_i - ^t y_j)^2 + (\{^b z_i - v_z[t-t_i]\} + ^t z_j)^2]^{1/2}. \quad (45)$$

Equation (42) then becomes $$\frac{p_j(t) - p_\infty}{\rho} = \sum_{i=1}^n \frac{1}{r_{ij}(t)} f'_i\left(t - \frac{r_{ij}(0)}{c}\right) - \qquad (46)$$

$$\sum_{i=1}^n \frac{1}{R_{ij}(t)} f'_i\left(t - \frac{R_{ij}(0)}{c}\right) - \frac{v_j^2(t)}{2}, \quad \text{for } j = 1, n$$

in which $$v_j(t) = \frac{1}{r_{jj}^2(t)} f_j\left(t - \frac{r_{jj}(0)}{c}\right) + \frac{1}{r_{jj}(t)c} f'_j\left(t - \frac{r_{jj}(0)}{c}\right). \qquad (47)$$

Solution of the Equations

The n pressure measurements described in equation (42) must be used to determine the wave function and its first derivative for every bubble. For each pressure transducer the pressure must be obtained from the recorded voltage by removing the impulse response of the transducer and the recording system, as described above. Essentially the calculation must proceed as described for a single gun, each gun having its own initialisation parameters, as described below. However, the recursion is carried out for every gun at each time step. Because of the finite velocity of sound, the contributions from nearby guns can always be computed from previously computed signals. Since these time delays are in general non-integer numbers of time samples, the actual amplitudes of the contributions must be computed by interpolation.

There is interaction between the bubbles in an array which affects the external pressure on each bubble. For example, the external pressure variation on the jth bubble is $$\frac{pw_j(t) - p_{\infty,j}}{\rho} = \sum_{i=1}^n \frac{1}{b_{ij}(t)} f'_i\left(t - \frac{b_{ij}(0)}{c}\right) - \qquad (48)$$

$$\sum_{i=1}^n \frac{1}{B_{ij}(t)} f'_i\left(t - \frac{B_{ij}(0)}{c}\right),$$

in which $pw_j(t)$ is the external pressure on the jth bubble, $p_{\infty,j}$ is the hydrostatic pressure at the jth bubble, $b_{ij}(t)$ is the distance from the centre of the ith bubble to the centre of the jth bubble:

$$b_{ij}(t) = [(^b x_i - \{^b x_j - v_x[t_j - t_i]\})^2 + (^b y_i - ^b y_j)^2 + (\{^b z_i - v_z[t_j - t_i]\} - ^b z_j)^2]^{1/2} \quad (49)$$

and $B_{ij}(t)$ is the distance from the centre of the virtual image of the ith bubble to the centre of the jth bubble:

$$B_{ij}(t) = [(^b x_i - \{^b x_j - v_x[t_j - t_i]\})^2 + (^b y_i - ^b y_j)^2 + (\{^b z_i - v_z[t_j - t_i]\} + ^b z_j)^2]^{1/2} \quad (50)$$

as illustrated in FIG. 13. In the recursive calculations, the steps for each gun are the same as described above except for modifications to equations (7), (14), (29), (32) and (33). For the jth gun, equation (7) becomes $$p_{\infty,j} = p_{ATM} + \rho g\, ^b z_j \qquad [7A]$$

in which $^b z_j$ is the depth of the jth gun; equation (14) becomes $$p_{B,j}(i) = \rho H_j(i) + pw_j(i), \qquad [14A]$$

equation (29) becomes $$p_{B,j}(i)=\rho H_j(i)+pw_j(i), \quad [29A]$$

equation (32) becomes $$\frac{DH(i)}{Dt} = \frac{p'(i) - pw'_j(i)}{\rho} \quad [32A]$$

and equation (33) becomes $$\frac{D^2 H(i)}{Dt^2} = \frac{p''(i) - pw''_j(i)}{\rho}. \quad [33A]$$

Calibration

Consider the firing of only one gun. The outgoing signal will be received at all the near field pressure sensors. When the jth gun fires alone, there are four unknown parameters which must be found; $v_j(1)$ the initial value of the particle velocity at the sensor associated with the jth gun; $V_{B,j}(1)$ the initial value of the bubble volume; $v_x$ the horizontal component of the relative velocity between the transducers and the bubbles; and $v_z$ the buble rise velocity. These parameters can be found be trial and error, by first assuming their values, solving equations (42) for only the jth gun firing, and the by searching for the combination of parameters that minimises the errors between the measured and calculated signals at all but the jth transducer. This yields the best estimate of these parameters. This can be repeated for all guns.

This could be done at the run-in or run-out of a line.

Calculation of the Far Field Signature of an Air Gun Array

When an array of guns fires we need to be able to calculate the signature at any point in the water, for instance at the point (x,y,z). If this point is at least 1 m from all the guns in the array, the pressure at this point is the superposition of the pressure waves from all the bubbles, ignoring all the non-linear terms:

$$\frac{p(x, y, z, t) - p_\infty}{\rho} = \sum_{i=1}^n \frac{1}{r_i(t)} f'_i\left(t - \frac{r_i(0)}{c}\right) - \sum_{i=1}^n \frac{1}{R_i(t)} f'_i\left(t - \frac{R_i(0)}{c}\right), \quad (51)$$

in which, there are n guns, $$r_i(t)=[(^b x_i-\{x-v_x[t-t_i]\})^2+(^b y_i-y)^2+(\{^b z_i-v_z[t-t_i]\}-z)^2]^{1/2} \quad (52)$$

and $$R_i(t)=[(^b x_i-\{x-v_x[t-t_i]\})^2+(^b y_i-y)^2+(\{^b z_i-v_z[t-t_i]\}+z)^2]^{1/2}. \quad (53)$$

What is claimed is:

1. A method of predicting the signature of a marine seismic source operating in a marine body of water and having a bubble outlet, comprising actuating the marine seismic source to introduce into the body of water through the bubble outlet a gas bubble which generates a seismic pressure wave in the body of water, obtaining, from pressure measuring means mounted on the marine seismic source, pressure signals representative of the pressure within the body of water over an interval of time and processing the pressure signals to determine the signature of the marine seismic source at a relative large distance therefrom, wherein the pressure measuring means is mounted sufficiently close to the bubble outlet to be engulfed by the gas bubble shortly after the gas bubble is introduced into the marine body of water, and wherein said processing of the pressure signals takes into account both linear and non-linear components of the seismic pressure wave in the water and both instantaneous water and gas pressures measured by the pressure measuring means when positioned, respectively, outside and inside the gas bubble.

2. A method according to claim 1, wherein initial calibration measurements are made at two different locations to establish initial gas bubble parameters to enable the wavefield of the marine seismic source to be determined.

3. A method according to claim 1, wherein the processing of the pressure signals involves solving the equations:

$$v(r, t) = \frac{1}{r^2} f\left(t - \frac{r}{c}\right) + \frac{1}{rc} f'\left(t - \frac{r}{c}\right), \quad \text{and}$$

$$\frac{p(r, t) - p_\infty}{\rho} = \frac{1}{r} f'\left(t - \frac{r}{c}\right) - \frac{v^2(r, t)}{2}$$

where r is the radial distance from the centre of the bubble, c is the speed of sound, t is time, p(r,t) is the pressure, $\rho$ is the density of the water, v(r,t) is the particle velocity, $f(t)$ is the rate of change of volume of the oscillating bubble and $f'(t)$ is the time derivative of $f(t)$, and determining initial values for $f(t)$ and $f'(t)$ by taking initial calibration measurements at two different locations.

4. A method according to claim 1, wherein the pressure of the wavefield at any point in the water comprises a superposition of the linear and non-linear components of the spherical seismic pressure wave.

5. A method according to claim 1, wherein the pressure measuring means is positioned no more than 1 m from the bubble outlet of the marine seismic source.

6. A method according to claim 1, wherein the pressure signals obtained when the pressure measuring means is engulfed by the gas bubble are processed to determine the water pressure and particle velocity outside the gas bubble.

7. A method of predicting the signature of an array of marine seismic sources arranged in a marine body of water and each having a bubble outlet, comprising actuating the marine seismic sources to introduce into the body of water, through said bubble outlets, a gas bubble for each seismic source, the gas bubbles generating seismic pressure waves which interact with each other to create a composite seismic pressure wave in the body of water, obtaining, from separate pressure measuring means mounted on each marine seismic source, pressure signals representative, over intervals of time, of the pressure within the body of water close to each marine seismic source and processing the pressure signals to determine the signature of the array of marine seismic sources at a relatively large distance therefrom, wherein each pressure measuring means is mounted sufficiently close to its associated bubble outlet to be engulfed by the gas bubble from that bubble outlet shortly after the gas bubble is introduced into the marine body of water and wherein said processing of the pressure signals takes into account, for each pressure signal, both linear and non-linear components of the seismic pressure waves, and also takes into account whether each pressure signal represents instantaneous gas pressure or water pressure depending, respectively, on whether the pressure measuring means in question is or is not engulfed by a gas bubble.

8. A method according to claim 7, wherein said processing of the pressure signals takes account, for each pressure signal, of the linear components of all the seismic pressure waves and the non-linear components of the seismic pressure wave generated by the seismic source associated with the pressure measuring means providing the pressure signal in question.

9. A method according to claim 7, wherein initial calibration measurements are made by actuating each seismic source separately and obtaining pressure signals with the pressure measuring means associated with each of the other seismic sources of the array thereby to establish initial gas bubble parameters and to enable the wavefield of the array of marine seismic sources to be determined.

10. A method according to claim 7, wherein initial calibration measurements are made by actuating each seismic source separately and obtaining pressure signals with the pressure measuring means associated with each of the seismic sources of the array thereby to obtain for each seismic source initial values, at the moment of its actuation, for $f(t)$ and $f'(t)$ to solve the equations:

$$v(r,t) = \frac{1}{r^2}f\left(t-\frac{r}{c}\right) + \frac{1}{rc}f'\left(t-\frac{r}{c}\right), \text{ and}$$

$$\frac{p(r,t)-p_\infty}{\rho} = \frac{1}{r}f'\left(t-\frac{r}{c}\right) - \frac{v^2(r,t)}{2}$$

where r is the radial distance from the centre of the bubble, c is the speed of sound, t is time, p(r,t) is the pressure, ρ is the density of the water, v(r,t) is the particle velocity, $f(t)$ is the rate of change of volume of the oscillating bubble and $f'(t)$ is the time derivative of $f(t)$.

11. A method according to claim 7, wherein the pressure of the wavefield at any point in the water comprises a superposition of the linear and non-linear components of the individual pressure waves created by each seismic source.

12. A method according to claim 7, wherein each pressure measuring means is positioned no more than 1 m from the bubble outlet of the marine seismic source with which it is associated.

13. A method according to claim 7, wherein the pressure signals obtained from any pressure measuring means engulfed by a gas bubble are processed to determine the water pressure and particle velocity outside the gas bubble.

14. A method according to claim 7, wherein said seismic sources are positioned at least 0.5 m apart.

15. A method according to claim 7, wherein the gas within the or each gas bubble is air.

16. Marine seismic source apparatus comprising a marine seismic source having a bubble outlet through which an oscillating gas bubble is introduced into a marine body of water to generate a seismic pressure wave in the body of water, pressure sensing means mounted on the marine seismic source to obtain signals representative of pressures outside the marine seismic source, and processing means for processing pressure signals derived from said pressure sensing means to determine the signature of the marine seismic source at a relatively large distance therefrom, wherein the pressure sensing means is mounted sufficiently close to the bubble outlet to be engulfed by a gas bubble shortly after the gas bubble is introduced into a marine body of water in use of the apparatus, and wherein, in use of the apparatus, the processing means takes account of both linear and non-linear components of the seismic pressure wave and whether the pressure signals are representative of instantaneous gas pressure or water pressure depending, respectively, on whether the pressure measuring means is or is not engulfed by a gas bubble.

17. Apparatus according to claim 16, wherein the pressure sensing means is positioned less than 1 m from said bubble outlet.

18. Apparatus according to claim 16, wherein the apparatus comprises an array of marine seismic sources each having separate pressure sensing means associated therewith and wherein said processing means processes pressure signals derived from each of the pressure sensing means.

19. Apparatus according to claim 18, wherein said marine seismic sources are spaced at least 0.5 m apart.

20. Apparatus according to claim 18, wherein said marine seismic sources are spaced at least 1.0 m apart.

* * * * *

UNITED STATES PATENT AND TRADEMARK OFFICE
CERTIFICATE OF CORRECTION

PATENT NO. : 6,081,765
DATED : June 27, 2000
INVENTOR(S) : Ziolkowski

It is certified that error appears in the above-indentified patent and that said Letters Patent is hereby corrected as shown below:

Column 6, formula (7)   "$P_\infty = P_{ATM} + \rho g^h z$,"   should be -- $P_\infty = P_{ATM} + \rho g^h z$, --

Column 8, formula (25)   "$r_B(i+1) \geq r$."   should be -- $r_B(i+1) \geq r$. --

Column 11, line 58,   "At time $t \geq t_j$,"   should be --At time $t \geq t_j$, --

Column 13, line 26, "the" (second occurrence) should be --then--;

Signed and Sealed this

Third Day of April, 2001

Attest:

NICHOLAS P. GODICI

Attesting Officer   Acting Director of the United States Patent and Trademark Office